United States Patent
Zhou et al.

(10) Patent No.: US 11,915,006 B2
(45) Date of Patent: Feb. 27, 2024

(54) METHOD, SYSTEM AND DEVICE FOR IMPROVED EFFICIENCY OF PIPELINE PROCESSING OF INSTRUCTIONS, AND COMPUTER STORAGE MEDIUM

(71) Applicant: Inspur Suzhou Intelligent Technology Co., Ltd., Jaingsu (CN)

(72) Inventors: Yulong Zhou, Suzhou (CN); Tongqiang Liu, Jiangsu (CN); Xiaofeng Zou, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 60 days.

(21) Appl. No.: 17/640,589

(22) PCT Filed: Nov. 28, 2019

(86) PCT No.: PCT/CN2019/121578
§ 371 (c)(1),
(2) Date: Mar. 4, 2022

(87) PCT Pub. No.: WO2021/042596
PCT Pub. Date: Mar. 11, 2021

(65) Prior Publication Data
US 2022/0334844 A1    Oct. 20, 2022

(30) Foreign Application Priority Data

Sep. 4, 2019   (CN) .......................... 201910832252.3

(51) Int. Cl.
*G06F 9/38* (2018.01)
(52) U.S. Cl.
CPC .......... *G06F 9/3861* (2013.01); *G06F 9/3867* (2013.01)

(58) Field of Classification Search
CPC ............................ G06F 9/3861; G06F 9/3867
See application file for complete search history.

(56) References Cited

U.S. PATENT DOCUMENTS

| | | | |
|---|---|---|---|
| 2003/0135719 A1 | 7/2003 | DeWitt et al. | |
| 2005/0138480 A1* | 6/2005 | Srinivasan | G06F 9/3861 |
| | | | 712/E9.05 |

(Continued)

FOREIGN PATENT DOCUMENTS

| | | |
|---|---|---|
| CN | 103984525 A | 8/2014 |
| CN | 104423927 A | 3/2015 |
| CN | 106843816 A | 6/2017 |

OTHER PUBLICATIONS

International Search Report and Written Opinion dated Jun. 3, 2020, in reference to co-pending Chinese Patent Application No. PCT/CN2019/121578 filed Nov. 28, 2019.

*Primary Examiner* — Courtney P Carmichael-Moody
(74) *Attorney, Agent, or Firm* — Dinsmore & Shohl LLP

(57) ABSTRACT

A method, system and device for pipeline processing of instructions and a computer storage medium. The method comprises: acquiring a target instruction set (S101); acquiring a target prediction result, wherein the target prediction result is a result obtained by predicting a jump mode of the target instruction set (S102); performing pipeline processing on the target instruction set according to the target prediction result (S103); determining if a pipeline flushing request is received (S104); and if so, correspondingly saving the target instruction set and a corresponding pipeline processing result, so as to perform pipeline processing on the target instruction set again on the basis of the pipeline processing result (S105). By means of the method, system, and device and computer-readable storage medium, a target instruction set and a corresponding pipeline processing result are correspondingly saved, so that when the target instruction set is (Continued)

subsequently processed again, the saved pipeline processing result can be directly used to perform pipeline processing, and the efficiency of pipeline processing of instructions can be improved.

11 Claims, 5 Drawing Sheets

(56) References Cited

U.S. PATENT DOCUMENTS

| | | | |
|---|---|---|---|
| 2008/0195844 A1* | 8/2008 | Shen | G06F 9/3861 712/205 |
| 2010/0042811 A1* | 2/2010 | Peled | G06F 9/30094 712/205 |
| 2011/0107071 A1* | 5/2011 | Jacob (Yaakov) | G06F 9/3804 712/241 |
| 2014/0025894 A1* | 1/2014 | Kwon | G06F 9/3808 711/125 |

* cited by examiner

METHOD, SYSTEM AND DEVICE FOR IMPROVED EFFICIENCY OF PIPELINE PROCESSING OF INSTRUCTIONS, AND COMPUTER STORAGE MEDIUM

This application claims priority to Chinese patent application No. 201910832252.3, entitled "METHOD, SYSTEM AND DEVICE FOR PIPELINE PROCESSING OF INSTRUCTIONS, AND COMPUTER STORAGE MEDIUM", filed with the China National Intellectual Property Administration on Sep. 4, 2019, the disclosure of which is hereby incorporated by reference in its entirety.

TECHNICAL FIELD

The present invention relates to the field of computer technologies, and in particular, to a method, system and device for pipeline processing of instructions, and a computer-readable storage medium.

BACKGROUND ART

Currently, in a device such as a server, it may be set that a Central Processing Unit (CPU) processes instructions in a pipelined manner to improve the computing efficiency of the CPU and the parallelism of instruction execution. A pipeline of a Reduced Instruction Set Computer FIVE (RISC-V) architecture is used as an example. An instruction execution channel may be divided into five units. An inter-level register is used between units of the pipeline in the channel to store corresponding control signals and data. Corresponding pipeline structures are Instruction Fetch (Ifetch), Instruction Decode (Dec), Execute (Exec), Memory access (Mem) and a Register write back (WB). The CPU needs to process instructions according to the pipeline structures.

However, it is impossible to know if the structure of a conditional jump is to jump or not in an Ifetch stage of the pipeline. Therefore, the CPU can only make a prediction. It is only at the end of the pipeline that it can be known through actual operations if a branch should really jump or not. If it is found that an actual result is different from a predicted result, it indicates that the prediction fails. All prefetched wrong instructions need to be discarded, and a correct instruction stream needs to be fetched for processing. That is, pipeline flushing is required. As a result, the CPU is relatively inefficient in pipeline processing of instructions.

In summary, how to improve the efficiency of pipeline processing of instructions is currently an urgent problem to be resolved by a person skilled in the art.

SUMMARY OF THE INVENTION

In view of this, an objective of the patent of the present invention is to provide a method, system and device for pipeline processing of instructions, and a computer-readable storage medium. Specific solutions of the present invention are as follows:

A method for pipeline processing of instructions includes:
acquiring a target instruction set;
acquiring a target prediction result, where the target prediction result is a result obtained by predicting a jump mode of the target instruction set;
performing pipeline processing on the target instruction set according to the target prediction result; and
determining if a pipeline flushing request is received, and if so, correspondingly saving the target instruction set and a corresponding pipeline processing result, so as to perform pipeline processing on the target instruction set again on the basis of the pipeline processing result.

Preferably, after the correspondingly saving the target instruction set and a corresponding pipeline processing result, the method further includes:
acquiring a to-be-run instruction set;
determining if the to-be-run instruction set is coincident with the target instruction set; and
if the to-be-run instruction set is coincident with the target instruction set, performing pipeline processing on the to-be-run instruction set according to the pipeline processing result; or
if the to-be-run instruction set is not coincident with the target instruction set, directly performing pipeline processing on the to-be-run instruction set.

Preferably, the correspondingly saving the target instruction set and a corresponding pipeline processing result includes:
acquiring a PC value of the target instruction set, the pipeline processing result, and an instruction code; and
correspondingly saving the target instruction set and the pipeline processing result according to a preset format,
element types in the preset format including a pipeline processing result, an instruction code, and a PC value; and
the determining if the to-be-run instruction set is coincident with the target instruction set includes:
acquiring a PC value of the to-be-run instruction set; and
determining if the PC value of the to-be-run instruction set is coincident with the PC value of the target instruction set, and if so, determining that the to-be-run instruction set is coincident with the target instruction set, or if not, determining that the to-be-run instruction set is not coincident with the target instruction set.

Preferably, the correspondingly saving the target instruction set and a corresponding pipeline processing result includes:
acquiring decoding results of instructions in the target instruction set; and
correspondingly saving the target instruction set and the decoding results; and
the performing pipeline processing on the to-be-run instruction set according to the pipeline processing result includes:
directly performing pipeline processing on the decoding results starting from an execute stage of a pipeline architecture.

Preferably, the correspondingly saving the target instruction set and a corresponding pipeline processing result includes:
when the pipeline flushing request is received, using unexecuted instructions in the target instruction set as first-class instructions, and using instructions other than the first-class instructions in the target instruction set as second-class instructions;
acquiring decoding results of the first-class instructions, and correspondingly saving the first-class instructions and the decoding results; and
acquiring execution results of the second-class instructions, correspondingly saving the second-class instructions and the execution results; and
the performing pipeline processing on the to-be-run instruction set according to the pipeline processing result includes:
for instructions coincident with the first-class instructions in the to-be-run instruction set, directly performing pipeline processing on the decoding results starting from an execute stage of a pipeline architecture; and for instructions coincident with the second-class instructions in the to-be-run instruction set, directly performing pipeline processing on the execution results starting from a memory operation stage of the pipeline architecture.

Preferably, the correspondingly saving the target instruction set and a corresponding pipeline processing result includes:

acquiring processing results of the target instruction set in different stages of a pipeline architecture when the pipeline flushing request is received; and correspondingly saving the target instruction set and the processing results in the different stages of the pipeline architecture; and the performing pipeline processing on the to-be-run instruction set according to the pipeline processing result includes:

directly performing pipeline processing on the processing results according to the pipeline architecture starting from a next stage of a pipeline architecture stage corresponding to the processing results.

Preferably, the correspondingly saving the target instruction set and a corresponding pipeline processing result includes:

correspondingly saving the target instruction set and the pipeline processing result in a preset storage device.

A system for pipeline processing of instructions includes:

a first acquisition module, configured to acquire a target instruction set;

a second acquisition module, configured to acquire a target prediction result, where the target prediction result is a result obtained by predicting a jump mode of the target instruction set;

a first processing module, configured to perform pipeline processing on the target instruction set according to the target prediction result; and a first determining module, configured to determine if a pipeline flushing request is received, and if so, correspondingly save the target instruction set and a corresponding pipeline processing result, so as to perform pipeline processing on the target instruction set again on the basis of the pipeline processing result.

A device for pipeline processing of instructions includes:

a memory, configured to store a computer program; and a processor, configured to execute the computer program to implement any foregoing method.

A computer-readable storage medium is provided, the computer-readable storage medium storing a computer program, where a processor is configured to execute the computer program to implement any foregoing method.

A method for pipeline processing of instructions provided in the present application includes: acquiring a target instruction set; acquiring a target prediction result, where the target prediction result is a result obtained by predicting a jump mode of the target instruction set; performing pipeline processing on the target instruction set according to the target prediction result; and determining if a pipeline flushing request is received, and if so, correspondingly saving the target instruction set and a corresponding pipeline processing result, so as to perform pipeline processing on the target instruction set again on the basis of the pipeline processing result. In the method for pipeline processing of instructions provided in the present application, after pipeline processing is performed on the target instruction set and the pipeline flushing request is received, the target instruction set and the corresponding pipeline processing result are further correspondingly saved, so that when the target instruction set is subsequently processed again, the saved pipeline processing result can be directly used to perform pipeline processing, and the efficiency of pipeline processing of instructions can be improved compared with the prior art in which pipeline processing is performed again on the target instruction set. The system for pipeline processing of instructions and device, and the computer-readable storage medium provided in the present application also resolve the corresponding technical problem.

BRIEF DESCRIPTION OF THE DRAWINGS

To describe the technical solutions in the embodiments of the present invention or the prior art more clearly, the following briefly introduces the accompanying drawings required for describing the embodiments or the prior art. Apparently, the accompanying drawings in the following description show merely embodiments of the present invention, and a person of ordinary skill in the art may still derive other drawings from the provided accompanying drawings without creative efforts.

DETAILED DESCRIPTION OF THE EMBODIMENTS

The following clearly and completely describes the technical solutions in embodiments of the present invention with reference to the accompanying drawings in embodiments of the present invention. Apparently, the described embodiments are some rather than all of the embodiments of the present invention. All other embodiments acquired by persons of ordinary skill in the art on the basis of the embodiments of the present invention without creative efforts shall fall within the protection scope of the present invention.

Currently, in a device such as a server, it may be set that a CPU processes instructions in a pipelined manner to improve the computing efficiency of the CPU and the parallelism of instruction execution. A pipeline of an RISC-V architecture is used as an example. An instruction execution channel may be divided into five units. An inter-level register is used between units of the pipeline in the channel to store corresponding control signals and data. Corresponding pipeline structures are Instruction Fetch (Ifetch), Instruction Decode (Dec), Execute (Exec), Memory access (Mem) and a Register WB. The CPU needs to process instructions according to the pipeline structures.

However, it is impossible to know if the structure of a conditional jump is to jump or not in an Ifetch stage of the pipeline. Therefore, the CPU can only make a prediction. It is only at the end of the pipeline that it can be known through actual operations if a branch should really jump or not. If it is found that an actual result is different from a predicted result, it indicates that the prediction fails. All prefetched wrong instructions need to be discarded, and a correct instruction stream needs to be fetched for processing. That is, pipeline flushing is required. As a result, the power consumption of the CPU is wasted, and the performance of the CPU is lost. When the pipeline is deeper, the loss of the CPU is higher, it takes a longer time for the CPU to obtain a correct processing result, and the efficiency of the CPU in pipeline processing of instructions is lower. A method for pipeline processing of instructions according to the present application can improve to some extent the efficiency in pipeline processing of instructions.

Figure 1:
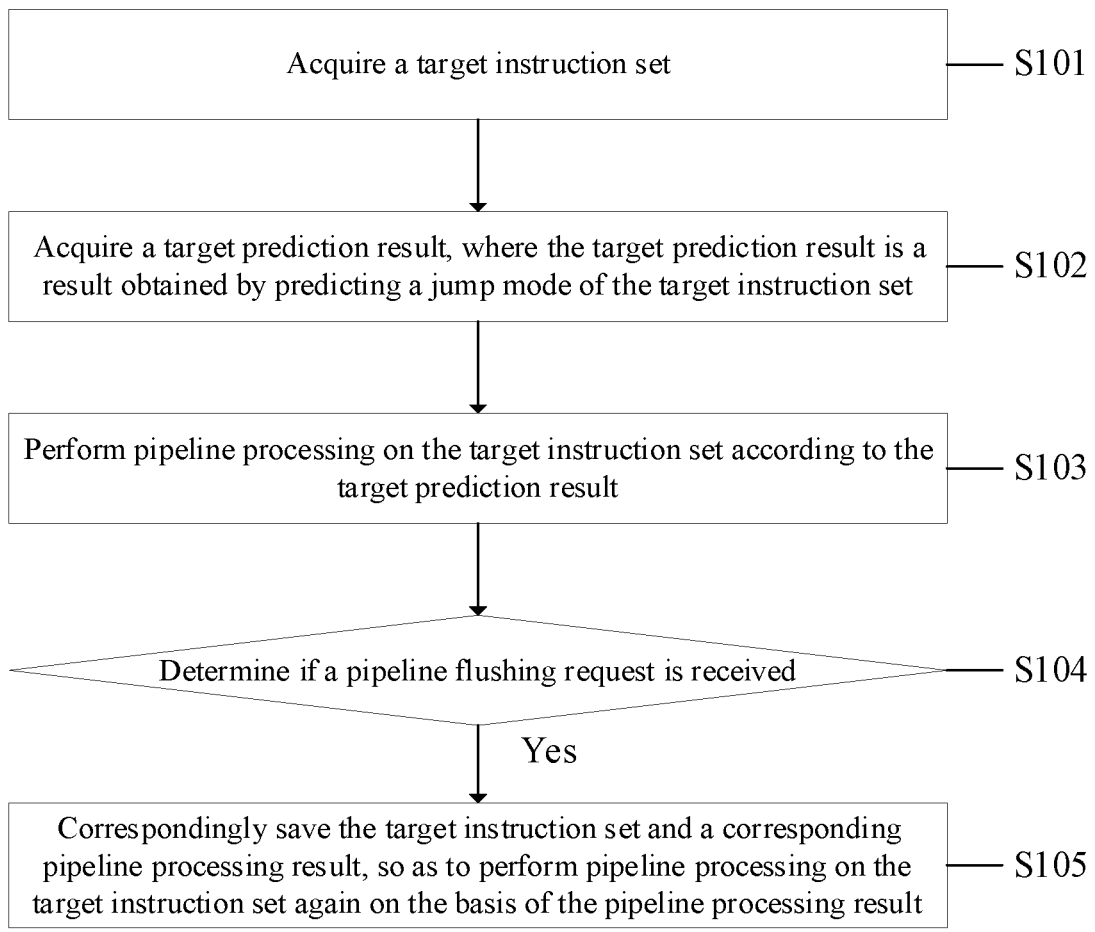
FIG. 1 is a first flowchart of a method for pipeline processing of instructions according to an embodiment of the present application.

FIG. 1 is a first flowchart of a method for pipeline processing of instructions according to an embodiment of the present application.

A method for pipeline processing of instructions according to an embodiment of the present application is applicable to a device such as a server, and may include the following steps:

Step S101: Acquire a target instruction set.

During actual application, a target instruction set may be acquired first. A quantity and types of instructions in the target instruction set may be determined according to an actual application scenario. For example, during a performance test of a server, the target instruction set may include a series of instructions and the like for performing the performance test on the server.

Step S102: Acquire a target prediction result, where the target prediction result is a result obtained by predicting a jump mode of the target instruction set.

During actual application, during processing of the target instruction set according to a pipeline architecture, when one instruction is faced with a plurality of jump paths, a jump path that the instruction is to take may be unclear. In this case, a jump mode of the target instruction set needs to be predicted to obtain a target prediction result. For a process of predicting the jump mode of the target instruction set, reference may be made to the prior art. This is not specifically limited herein in the present application.

Step S103: Perform pipeline processing on the target instruction set according to the target prediction result.

During actual application, after the target prediction result is obtained, the pipeline processing may be performed on the target instruction set according to the target prediction result. It should be pointed out that in a specific application scenario, a quantity of stages of the pipeline processing is not limited. For example, to acquire a relatively high running frequency, a quantity of stages of a pipeline architecture may be set relatively long. In this case, hardware logic accommodated in each stage of a pipeline is relatively small, the running frequency is relatively high, and further the throughput efficiency of the pipeline is relatively high. A quantity of stages of the pipeline may be determined according to an actual requirement. For example, there may be over ten stages or over twenty stages.

Step S104: Determine if a pipeline flushing request is received, and if so, perform step S105.

During actual application, because the target prediction result is the predicted jump mode of the target instruction set, a pipeline "execute" stage may need to be completed before it can be determined if a jump instruction of the target instruction set actually needs to generate a jump. Instructions are performed in a pipeline in a "pipelined" form. A classical five-stage pipeline model is used as an example.

When the first instruction is in an "execute" stage, the second instruction is in a "decode" stage. If the first instruction is a predicted branch jump instruction, the second instruction (and subsequent instructions of the second instruction) is in a predicted "execute" state. After if the first branch jump instruction actually requires a jump is determined through the "execute" stage, if it is found that prediction is incorrect, it indicates that the second instruction (and the subsequent instructions of the second instruction) needs to be canceled and discarded. In this case, a pipeline flushing request is generated. If it is found that prediction succeeds, it indicates that the second instruction (and the subsequent instructions of the second instruction) does not need to be canceled and may be actually executed. Therefore, after the pipeline processing is performed on the target instruction set according to the target prediction result, to determine if a pipeline processing result can be actually delivered, it needs to be determined if the pipeline flushing request is received.

In a specific application scenario, the pipeline flushing request may be generated externally and transmitted to the server or the like or may be automatically generated by the server or the like. A classical five-stage pipeline model is used as an example. When the first instruction is in an "execute" stage, the second instruction is in a "decode" stage. If the first instruction encounters an interruption or an exception, the second instruction and subsequent instructions all need to be canceled and discarded. That is, during running of the pipeline, due to the uncertainty of program execution, an exception may occur or a jump, subroutine or exception handling program returns, resulting in a change in sequentially executed instructions. The server or the like may count instruction jumps, and then determine, according to a running status of the target instruction set, if to generate the pipeline flushing request or the like.

Step S105: Correspondingly save the target instruction set and a corresponding pipeline processing result, so as to perform pipeline processing on the target instruction set again on the basis of the pipeline processing result.

During actual application, after it is determined that a pipeline flushing request is received, a target instruction set and a corresponding pipeline processing result may be correspondingly saved, so that pipeline processing is performed on the target instruction set again on the basis of a subsequent pipeline processing result, and the pipeline processing is prevented from being performed on the target instruction set again, thereby improving processing efficiency. It should be pointed out that when a pipeline flushing request is not received, pipeline processing of a target instruction set may be completed according to a set pipeline architecture.

A method for pipeline processing of instructions provided in the present application includes: acquiring a target instruction set; acquiring a target prediction result, where the target prediction result is a result obtained by predicting a jump mode of the target instruction set; performing pipeline processing on the target instruction set according to the target prediction result; and determining if a pipeline flushing request is received, and if so, correspondingly saving the target instruction set and a corresponding pipeline processing result, so as to perform pipeline processing on the target instruction set on the basis of the pipeline processing result. In the method for pipeline processing of instructions provided in the present application, after pipeline processing is performed on the target instruction set according to the target prediction result and the pipeline flushing request is received, the target instruction set and the corresponding pipeline processing result are further correspondingly saved, so that when the target instruction set is subsequently processed again, the saved pipeline processing result can be directly used to perform pipeline processing, and the efficiency of pipeline processing of instructions can be improved compared with the prior art in which pipeline processing is performed again on the target instruction set.

Figure 2:
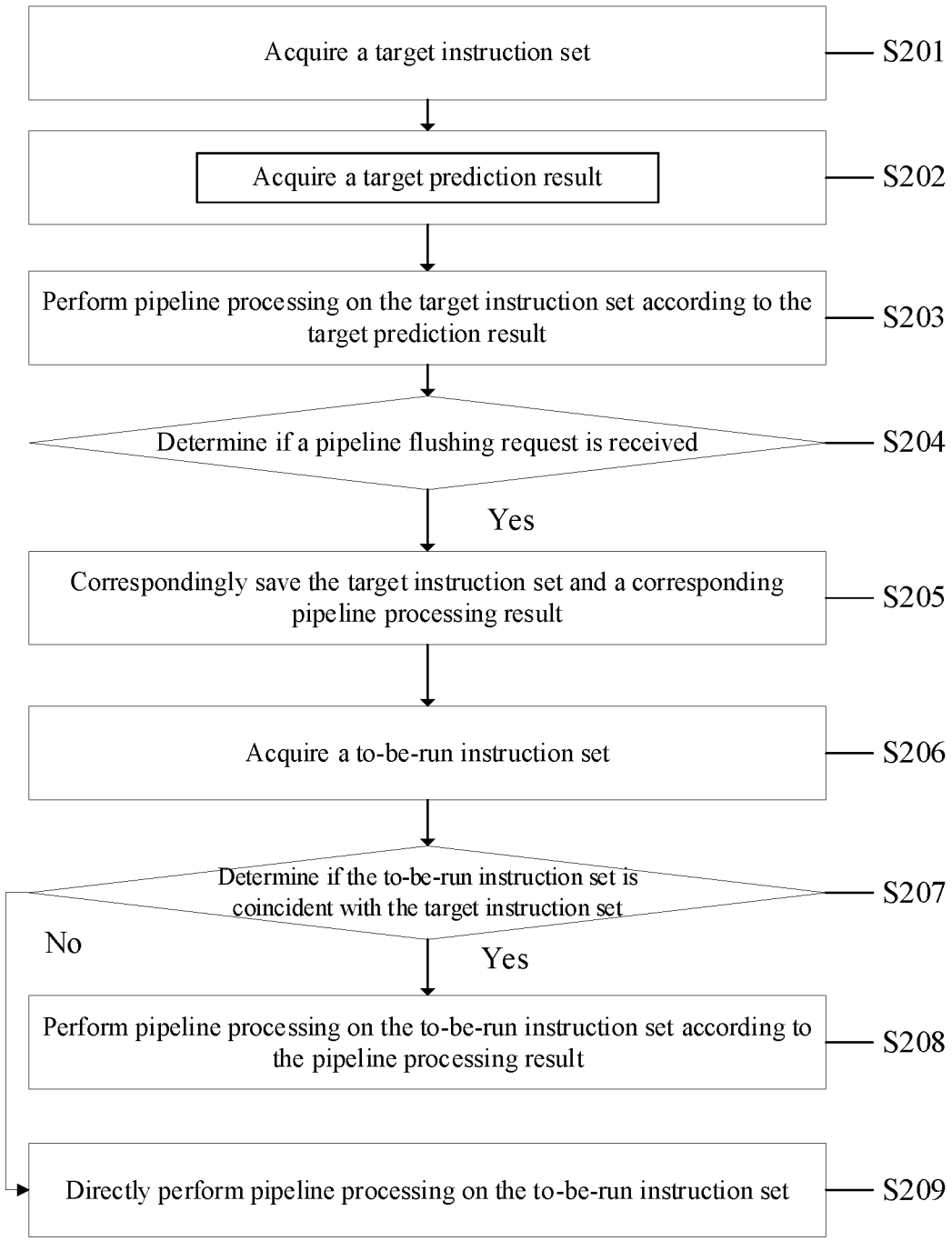
FIG. 2 is a second flowchart of a method for pipeline processing of instructions according to an embodiment of the present application.

FIG. 2 is a second flowchart of a method for pipeline processing of instructions according to an embodiment of the present application.

During actual application, a method for pipeline processing of instructions according to an embodiment of the present application may include the following steps:

Step S201: Acquire a target instruction set.

Step S202: Acquire a target prediction result.

Step S203: Perform pipeline processing on the target instruction set according to the target prediction result.

Step S204: Determine if a pipeline flushing request is received, and if so, perform step S105.

Step S205: Correspondingly save the target instruction set and a corresponding pipeline processing result.

Step S206: Acquire a to-be-run instruction set.

During actual application, the to-be-run instruction set is a to-be-run instruction set acquired again after the pipeline flushing request is received. Types and a quantity of instructions in the to-be-run instruction set may be determined according to an actual requirement.

Step S207: Determine if the to-be-run instruction set is coincident with the target instruction set, and if so, determine that the to-be-run instruction set is coincident with the target instruction set, and perform step S208, or if not, determine that the to-be-run instruction set is not coincident with the target instruction set, and perform step S209.

During actual application, because a pipeline processing process of the to-be-run instruction set is a new pipeline processing process, there may be a same instruction in the to-be-run instruction set and the target instruction set. A pipeline processing result of the instruction may be directly obtained according to saved pipeline processing results. Therefore, after the to-be-run instruction set is acquired, it may be first determined if the to-be-run instruction set is coincident with the target instruction set.

Step S208: Perform pipeline processing on the to-be-run instruction set according to the pipeline processing result.

During actual application, if it is determined that the to-be-run instruction set is coincident with the target instruction set, pipeline processing may be performed on the to-be-run instruction set according to the pipeline processing result.

It should be pointed out that a condition of determining if a to-be-run instruction set is coincident with a target instruction set is not limited in the present application. For example, to determine if a to-be-run instruction set is coincident with a target instruction set, when a quantity of same instructions in the to-be-run instruction set and the target instruction set is larger, the two instruction sets are more coincident. Therefore, a preset quantity may be set. The quantity of same instructions in the to-be-run instruction set and the target instruction set is compared with the preset quantity. If the quantity of same instructions in the to-be-run instruction set and the target instruction set is greater than or equal to the preset quantity, it is determined that the to-be-run instruction set is coincident with the target instruction set, or otherwise, it is determined that the to-be-run instruction set is not coincident with the target instruction set.

Step S209: Directly perform pipeline processing on the to-be-run instruction set.

During actual application, if the to-be-run instruction set is not coincident with the target instruction set, pipeline processing may be directly performed on the to-be-run instruction set again according to a set pipeline architecture.

In a method for pipeline processing of instructions provided in the embodiments of the present application, a PC value of an instruction is determined during instruction fetch, and the PC value of the instruction is unique. Therefore, the PC value may be used to determine if the to-be-run instruction set is coincident with the target instruction set. Specifically, when the target instruction set and the corresponding pipeline processing result are correspondingly saved, a PC value of the target instruction set, the pipeline processing result, and an instruction code may be acquired, and the target instruction set and the pipeline processing result are correspondingly saved according to a preset format, element types in the preset format including a pipeline processing result, an instruction code, and a PC value.

Correspondingly, a PC value of the to-be-run instruction set may be acquired to determine if the to-be-run instruction set is coincident with the target instruction set. It is determined if the PC value of the to-be-run instruction set is coincident with the PC value of the target instruction set. If so, it is determined that the to-be-run instruction set is coincident with the target instruction set, or if not, it is determined that the to-be-run instruction set is not coincident with the target instruction set.

Table 1 shows pipeline processing results saved in the preset format.

TABLE 1

| Pipeline processing results saved in the preset format | | | | | | |
|---|---|---|---|---|---|---|
| Output state n | Output state n − 1 | ... | Output state 3 | Output state 2 | Output state 1 | Instruction code | PC value |

In the method for pipeline processing of instructions provided in the embodiments of the present application, a pipeline flushing request appears only after an execute stage of a pipeline architecture. It means a decoding result of an instruction is accurate and usable when the pipeline flushing request is received. Therefore, to improve the usability of saved pipeline processing results, when the target instruction set and the corresponding pipeline processing result are correspondingly saved, decoding results of instructions in the target instruction set may be acquired, and the target instruction set and the decoding results are correspondingly saved.

Correspondingly, during pipeline processing of the to-be-run instruction set according to the pipeline processing result, pipeline processing may be directly performed on the decoding results starting from the execute stage of a pipeline architecture.

In the method for pipeline processing of instructions provided in the embodiments of the present application, when a pipeline flushing request is received, a processing result of an executed instruction is inconsistent with an actual processing result, and a processing result of an unexecuted instruction is more likely to be consistent with an actual processing result. That is, a probability that a processing result of an instruction in a decode stage and stages before the decode stage of the pipeline architecture can be used is higher. Therefore, to further improve the usability of the saved pipeline processing results, when the target instruction set and the corresponding pipeline processing result are correspondingly saved, when the pipeline flushing request is received, unexecuted instructions in the target instruction set may be used as first-class instructions, and instructions other than the first-class instructions in the target instruction set may be used as second-class instructions. Decoding results of the first-class instructions are acquired, and the first-class instructions and the decoding results are correspondingly saved. Execution results of the second-class instructions are acquired, and the second-class instructions and the execution results are correspondingly saved.

Correspondingly, during pipeline processing of the to-be-run instruction set according to the pipeline processing result, for instructions coincident with the first-class instructions in the to-be-run instruction set, pipeline processing may be directly performed on the decoding results starting from an execute stage of a pipeline architecture, and for instructions coincident with the second-class instructions in the to-be-run instruction set, pipeline processing may be directly performed on the execution results starting from a memory operation stage of the pipeline architecture.

In the method for pipeline processing of instructions provided in the embodiments of the present application, each instruction has different processing results in different stages of a pipeline architecture, and a probability that each instruction can be delivered is also different. If an instruction is used again, the instruction may have the same processing results in different stages of a pipeline. Therefore, to further improve the usability of the saved pipeline processing results, when the target instruction set and the corresponding pipeline processing result are correspondingly saved, processing results of the target instruction set in different stages of a pipeline architecture may be acquired when the pipeline flushing request is received, and the target instruction set and the processing results in the different stages of the pipeline architecture are correspondingly saved.

Correspondingly, during pipeline processing of the to-be-run instruction set according to the pipeline processing result, pipeline processing may be directly performed on the processing results according to the pipeline architecture starting from a next stage of a pipeline architecture stage corresponding to the processing results.

In the method for pipeline processing of instructions provided in the embodiments of the present application, due to the diversity and accountability of saved data, a relatively large storage space of a device such as a server may be occupied. To save the storage space of the device such as a server, when the target instruction set and the corresponding pipeline processing result are correspondingly saved, the target instruction set and the pipeline processing result may be correspondingly saved in a preset storage device. A type and a capacity of the preset storage device may be determined according to an actual requirement.

Figures 3, 4:
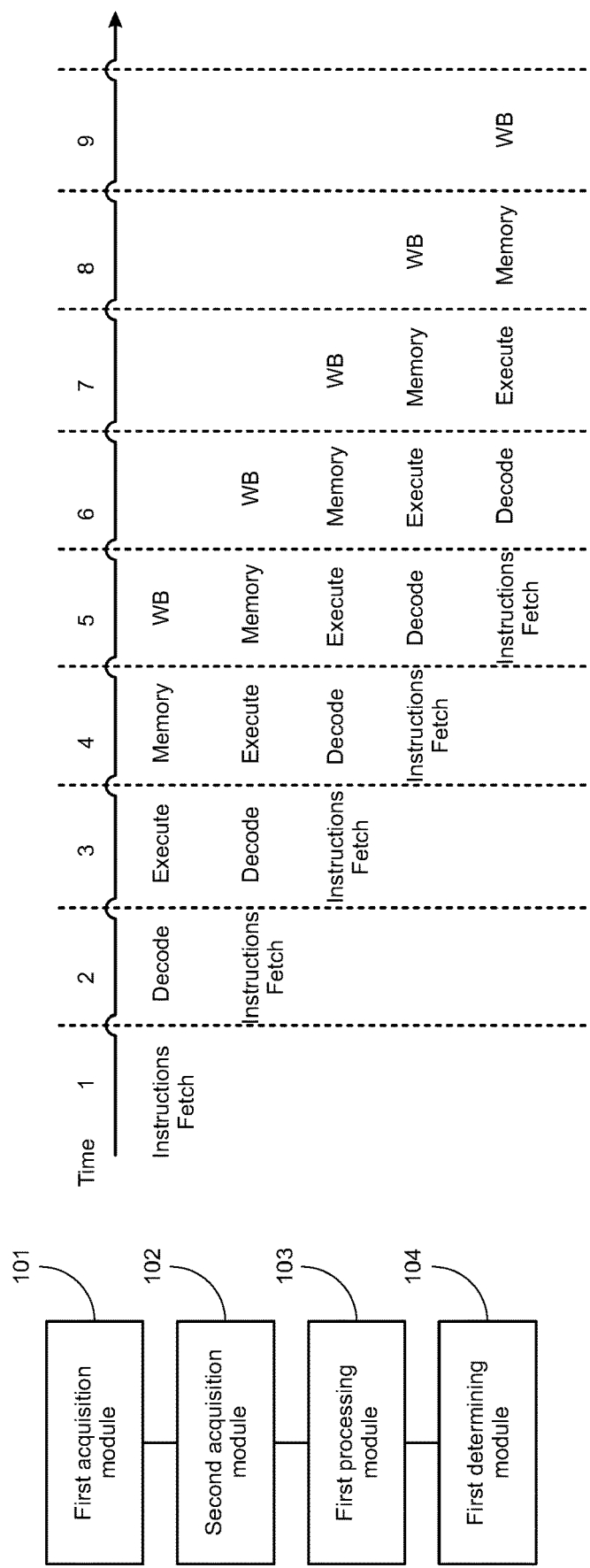
FIG. 3 is a schematic structural diagram of a system for pipeline processing of instructions according to an embodiment of the specification.
FIG. 4 is an architectural diagram of a five-stage pipeline.

FIG. 3 is a schematic structural diagram of a system for pipeline processing of instructions according to an embodiment of the specification.

The system for pipeline processing of instructions provided in the embodiments of the present application may include:

a first acquisition module 101, configured to acquire a target instruction set;

a second acquisition module 102, configured to acquire a target prediction result, where the target prediction result is a result obtained by predicting a jump mode of the target instruction set;

a first processing module 103, configured to perform pipeline processing on the target instruction set according to the target prediction result; and a first determining module 104, configured to determine if a pipeline flushing request is received, and if so, correspondingly save the target instruction set and a corresponding pipeline processing result, so as to perform pipeline processing on the target instruction set again on the basis of the pipeline processing result.

The system for pipeline processing of instructions provided in the embodiments of the present application may further includes:

a third acquisition module, configured to acquire a to-be-run instruction set after the first determining module correspondingly saves the target instruction set and the corresponding pipeline processing result;

a second determining module, configured to: determine if the to-be-run instruction set is coincident with the target instruction set; and if the to-be-run instruction set is coincident with the target instruction set, perform pipeline processing on the to-be-run instruction set according to the pipeline processing result; or if the to-be-run instruction set is not coincident with the target instruction set, directly perform pipeline processing on the to-be-run instruction set.

In the system for pipeline processing of instructions provided in the embodiments of the present application, the first determining module may include:

a first acquiring unit, configured to acquire a PC value of the target instruction set, the pipeline processing result, and an instruction code; and a first storage unit, configured to correspondingly save the target instruction set and the pipeline processing result according to a preset format, element types in the preset format including a pipeline processing result, an instruction code, a PC value, and a jump mode; and correspondingly, the second determining module may include:

a second acquiring unit, configured to acquire a PC value of the to-be-run instruction set; and a first determining unit, configured to: determine if the PC value of the to-be-run instruction set is coincident with the PC value of the target instruction set, and if so, determine that the to-be-run instruction set is coincident with the target instruction set, or if not, determine that the to-be-run instruction set is not coincident with the target instruction set.

In the system for pipeline processing of instructions provided in the embodiments of the present application, the first determining module may include:

a third acquiring unit, configured to acquire decoding results of instructions in the target instruction set;

and a second storage unit, configured to correspondingly save the target instruction set and the decoding results; and correspondingly, the second determining module may include:

a first processing unit, configured to directly perform pipeline processing on the decoding results starting from an execute stage of a pipeline architecture.

In the system for pipeline processing of instructions provided in the embodiments of the present application, the first determining module may include:

a first classification unit, configured to: when the pipeline flushing request is received, use unexecuted instructions in the target instruction set as first-class instructions, and use instructions other than the first-class instructions in the target instruction set as second-class instructions;

a third storage unit, configured to: acquire decoding results of the first-class instructions are acquired, and correspondingly save the first-class instructions and the decoding results; and a fourth storage unit, configured to: acquire execution results of the second-class instructions, and correspondingly save the second-class instructions and the execution results; and correspondingly, the second determining module may include:

a second processing unit, configured to: for instructions coincident with the first-class instructions in the to-be-run instruction set, directly perform pipeline processing on the decoding results starting from an execute stage of a pipeline architecture; and a third processing unit, configured to: for instructions coincident with the second-class instructions in the to-be-run instruction set, directly perform pipeline processing on the execution results starting from a memory operation stage of the pipeline architecture.

In the system for pipeline processing of instructions provided in the embodiments of the present application, the first determining module may include:

a fourth acquiring unit, configured to acquire processing results of the target instruction set in different stages of a pipeline architecture when the pipeline flushing request is received; and a fifth storage unit, configured to correspondingly save the target instruction set and the processing results in the different stages of the pipeline architecture; and correspondingly, the second determining module may include:

a fourth processing unit, configured to directly perform pipeline processing on the processing results according to the pipeline architecture starting from a next stage of a pipeline architecture stage corresponding to the processing results.

In the system for pipeline processing of instructions provided in the embodiments of the present application, the first determining module may include:

a sixth storage unit, configured to correspondingly save the target instruction set and the pipeline processing result in a preset storage device.

Figure 5:
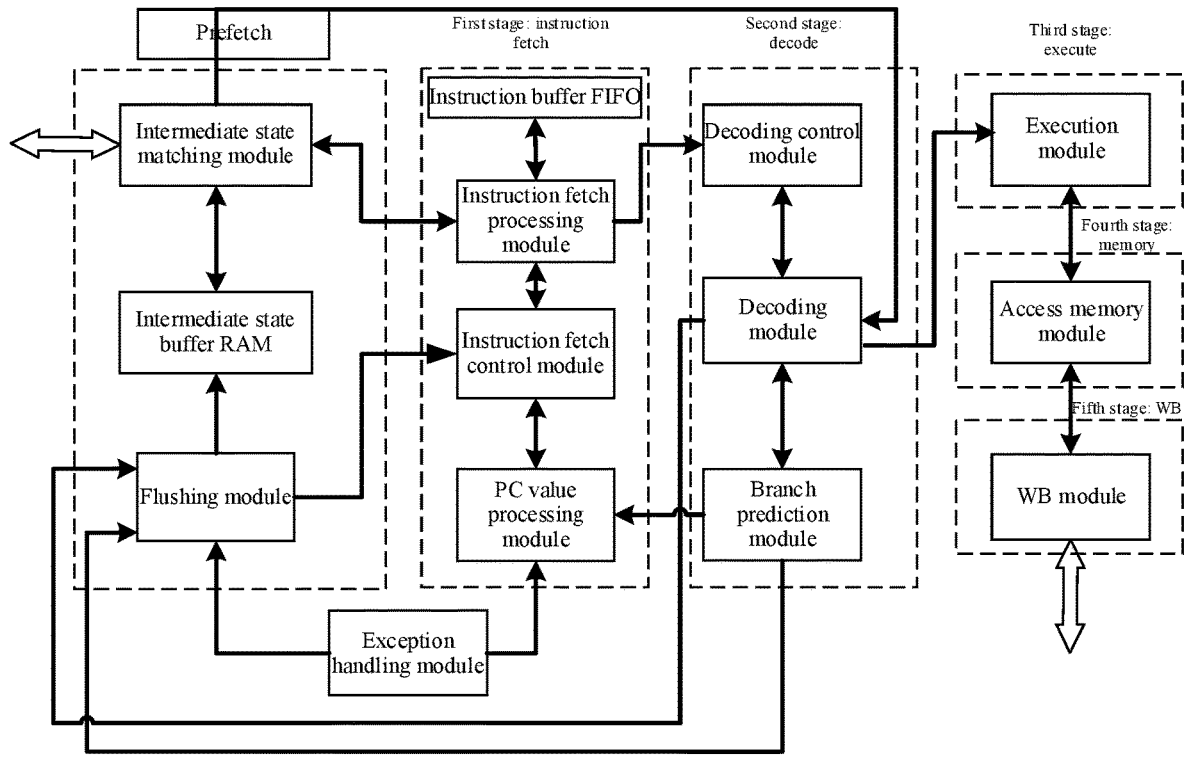
FIG. 5 is a schematic structural diagram of a system for pipeline processing of instructions according to the present application in an actual application.

It should be pointed out that the structure of the system for pipeline processing of instructions provided in the present application may be determined according to an actual requirement. For ease of understanding, a five-stage pipeline shown in FIG. 4 is used as an example to describe the system for pipeline processing of instructions in actual application. FIG. 5 is a schematic structural diagram of a system for pipeline processing of instructions according to the present application in an actual application.

In FIG. 5, the functions of the modules are shown as follows:

a flushing module, configured to: if pipeline flushing requests sent by an exception handling module and a branch prediction module are received, instruct an instruction fetch control module to pause an instruction fetch operation; and if a pipeline processing result of a prefetch instruction of a decoding module is received, store the prefetch instruction in an intermediate state buffer RAM;

the instruction fetch control module, configured to: if a pipeline flushing request from the flushing module is received, suspend a request of a PC value processing module, and instruct an instruction fetch processing module to complete processing of all prefetch instructions in an instruction buffer FIFO; or if a flushing request is not received, instruct the instruction fetch processing module and the PC value processing module to continue to perform the instruction fetch operation;

the instruction fetch processing module, configured to: if a pipeline flushing request from the instruction fetch control module is received, process all the prefetch instructions in the instruction buffer FIFO, and send pipeline processing results of the prefetch instructions to a decoding control module; or if a pipeline flushing request is not received, send pipeline processing results of the prefetch instructions to the decoding control module;

the decoding control module, configured to: if a pipeline flushing instruction processing request from the instruction fetch processing module is received, send a pipeline flushing instruction processing result to the decoding module; or if a pipeline flushing instruction processing request is not received, send a pipeline processing result of a prefetch instruction to the decoding module;

the decoding module, configured to: if the pipeline processing result of the prefetch instruction from the decoding control module is received, decode the prefetch instruction, after decoding is completed, packetize an intermediate state result according to a preset format, and send the intermediate state result to a flushing instruction processing module; if the intermediate state result sent by an intermediate state matching module is received, directly simultaneously output a related result to the branch prediction module and a next-stage module according to the specified preset format to sequentially perform processing (for example, an execution module, an access memory module, and a WB module); and if a pipeline flushing request is not received, simultaneously send a decoding result of the prefetch instruction to the branch prediction module and the next-stage module to sequentially perform processing (for example, the execution module, the access memory module, and the WB module);

the intermediate state matching module, configured to: if a read instruction request from the instruction fetch processing module is received, first perform matching on a PC value part of an instruction packet buffered in the intermediate state buffer RAM according to a PC value, and if matching succeeds, directly read the intermediate state result from the intermediate state buffer RAM and send the intermediate state result to the decoding module, or if matching does not succeed, send an instruction fetch request to a previous level, and wait to acquire an instruction and send the instruction to the instruction fetch processing module;

the exception handling module, responsible for handling an exception of a processor, and generating the pipeline flushing request;

the PC value processing module, responsible for generating a PC value of instruction fetch of the processor;

the branch prediction module, configured to guess which branch is to be run before execution of a branch instruction ends to improve the performance of an instruction pipeline of the processor;

the execution module, configured to emit an instruction to a specific arithmetic unit according to a specific operation type of the instruction for execution;

the access memory module, configured to access a data memory; and the WB module, configured to write back an execution result in a register.

Figure 6:
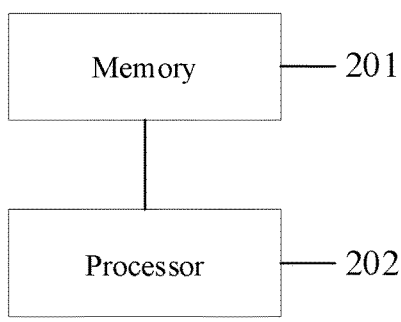
FIG. 6 is a schematic structural diagram of a device for pipeline processing of instructions according to an embodiment of the specification.

The present application further provides a device for pipeline processing of instructions and a computer-readable storage medium, which both have corresponding effects of the method for pipeline processing of instructions provided in the embodiments of the present application. FIG. 6 is a schematic structural diagram of a device for pipeline processing of instructions according to an embodiment of the specification.

A device for pipeline processing of instructions provided in the embodiments of the present application includes a memory 201 and a processor 202. The memory 201 stores a computer program. The processor 202 executes the computer program to implement the following steps:

acquiring a target instruction set;

acquiring a target prediction result, where the target prediction result is a result obtained by predicting a jump mode of the target instruction set;

performing pipeline processing on the target instruction set according to the target prediction result;

and determining if a pipeline flushing request is received, and if so, correspondingly saving the target instruction set and a corresponding pipeline processing result, so as to perform pipeline processing on the target instruction set again on the basis of the pipeline processing result.

A device for pipeline processing of instructions provided in the embodiments of the present application includes a memory 201 and a processor 202. The memory 201 stores a computer program. The processor 202 executes the computer program to implement the following steps: after the target instruction set and the corresponding pipeline processing result are correspondingly saved, acquiring a to-be-run instruction set; determining if the to-be-run instruction set is coincident with the target instruction set; and if the to-be-run instruction set is coincident with the target instruction set, performing pipeline processing on the to-be-run instruction set according to the pipeline processing result; or if the to-be-run instruction set is not coincident with the target instruction set, directly performing pipeline processing on the to-be-run instruction set.

A device for pipeline processing of instructions provided in the embodiments of the present application includes a memory 201 and a processor 202. The memory 201 stores a computer program. The processor 202 executes the computer program to implement the following steps: acquiring a PC value of the target instruction set, the pipeline processing result, and an instruction code; correspondingly saving the target instruction set and the pipeline processing result according to a preset format, element types in the preset format including a pipeline processing result, an instruction code, a PC value; correspondingly, acquiring a PC value of the to-be-run instruction set; and determining if the PC value of the to-be-run instruction set is coincident with the PC value of the target instruction set, and if so, determining that the to-be-run instruction set is coincident with the target instruction set, or if not, determining that the to-be-run instruction set is not coincident with the target instruction set.

A device for pipeline processing of instructions provided in the embodiments of the present application includes a memory 201 and a processor 202. The memory 201 stores a computer program. The processor 202 executes the computer program to implement the following steps: acquiring decoding results of instructions in the target instruction set; correspondingly saving the target instruction set and the decoding results; and correspondingly, directly performing pipeline processing on the decoding results starting from an execute stage of a pipeline architecture.

A device for pipeline processing of instructions provided in the embodiments of the present application includes a memory 201 and a processor 202. The memory 201 stores a computer program. The processor 202 executes the computer program to implement the following steps: when the pipeline flushing request is received, using unexecuted instructions in the target instruction set as first-class instructions, and using instructions other than the first-class instructions in the target instruction set as second-class instructions; acquiring decoding results of the first-class instructions, and correspondingly saving the first-class instructions and the decoding results; acquiring execution results of the second-class instructions, and correspondingly saving the second-class instructions and the execution results; correspondingly, for instructions coincident with the first-class instructions in the to-be-run instruction set, directly performing pipeline processing on the decoding results starting from an execute stage of a pipeline architecture; and for instructions coincident with the second-class instructions in the to-be-run instruction set, directly performing pipeline processing on the execution results starting from a memory operation stage of the pipeline architecture.

A device for pipeline processing of instructions provided in the embodiments of the present application includes a memory 201 and a processor 202. The memory 201 stores a computer program. The processor 202 executes the computer program to implement the following steps: acquiring processing results of the target instruction set in different stages of a pipeline architecture when the pipeline flushing request is received; correspondingly saving the target instruction set and the processing results in the different stages of the pipeline architecture; and correspondingly, directly performing pipeline processing on the processing results according to the pipeline architecture starting from a next stage of a pipeline architecture stage corresponding to the processing results.

A device for pipeline processing of instructions provided in the embodiments of the present application includes a memory 201 and a processor 202. The memory 201 stores a computer program. The processor 202 executes the computer program to implement the following step: correspondingly saving the target instruction set and the pipeline processing result in a preset storage device.

Figure 7:
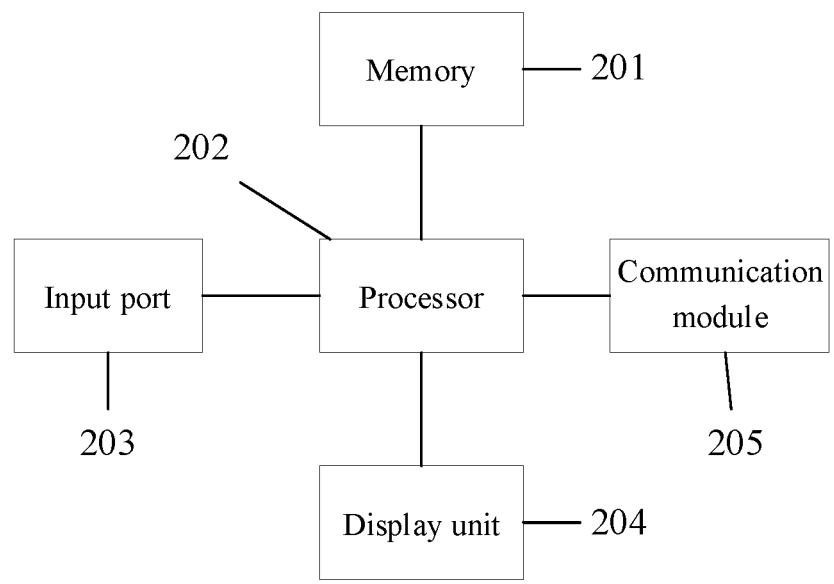
FIG. 7 is another schematic structural diagram of a device for pipeline processing of instructions according to an embodiment of the specification.

Referring to FIG. 7, another device for pipeline processing of instructions provided in the embodiments of the present application may further include: an input port 203 connected to the processor 202 and configured to transmit a command inputted from the outside into the processor 202; a display unit 204 connected to the processor 202 and configured to display a processing result of the processor 202 to the outside; and a communication module 205 connected to the processor 202 and configured to implement communication between the device for pipeline processing of instructions and the outside. The display unit 204 may be a display panel, a laser scanning display, or the like. Communication methods used by the communication module 205 include, but not limited to, Mobile High-Definition Link (MHL) technology, Universal Serial Bus (USB), High-Definition Multimedia Interface (HDMI), and wireless connections: Wireless Fidelity (Wi-Fi) technology, Bluetooth communication technology, Bluetooth Low Energy communication technology, and communication technology on the basis of IEEE802.11s.

Embodiments of the present application provide a computer-readable storage medium. The computer-readable storage medium stores a computer program. A processor is configured to execute the computer program to implement the following steps:

acquiring a target instruction set;

acquiring a target prediction result, where the target prediction result is a result obtained by predicting a jump mode of the target instruction set;

performing pipeline processing on the target instruction set according to the target prediction result; and determining if a pipeline flushing request is received, and if so, correspondingly saving the target instruction set and a corresponding pipeline processing result, so as to perform pipeline processing on the target instruction set again on the basis of the pipeline processing result.

Embodiments of the present application provide a computer-readable storage medium. The computer-readable storage medium stores a computer program. A processor is configured to execute the computer program to implement the following steps: after the target instruction set and the corresponding pipeline processing result are correspondingly saved, acquiring a to-be-run instruction set; determining if the to-be-run instruction set is coincident with the target instruction set; and if the to-be-run instruction set is coincident with the target instruction set, performing pipeline processing on the to-be-run instruction set according to the pipeline processing result; or if the to-be-run instruction set is not coincident with the target instruction set, directly performing pipeline processing on the to-be-run instruction set.

Embodiments of the present application provide a computer-readable storage medium. The computer-readable storage medium stores a computer program. A processor is configured to execute the computer program to implement the following steps: acquiring a PC value of the target instruction set, the pipeline processing result, and an instruction code; correspondingly saving the target instruction set and the pipeline processing result according to a preset format, element types in the preset format including a pipeline processing result, an instruction code, a PC value; correspondingly, acquiring a PC value of the to-be-run instruction set; and determining if the PC value of the to-be-run instruction set is coincident with the PC value of the target instruction set, and if so, determining that the to-be-run instruction set is coincident with the target instruction set, or if not, determining that the to-be-run instruction set is not coincident with the target instruction set.

Embodiments of the present application provide a computer-readable storage medium. The computer-readable storage medium stores a computer program. A processor is configured to execute the computer program to implement the following steps: acquiring decoding results of instructions in the target instruction set; correspondingly saving the target instruction set and the decoding results; and correspondingly, directly performing pipeline processing on the decoding results starting from an execute stage of a pipeline architecture.

Embodiments of the present application provide a computer-readable storage medium. The computer-readable storage medium stores a computer program. A processor is configured to execute the computer program to implement the following steps: when the pipeline flushing request is received, using unexecuted instructions in the target instruction set as first-class instructions, and using instructions other than the first-class instructions in the target instruction set as second-class instructions; acquiring decoding results of the first-class instructions, and correspondingly saving the first-class instructions and the decoding results; acquiring execution results of the second-class instructions, and correspondingly saving the second-class instructions and the execution results; correspondingly, for instructions coincident with the first-class instructions in the to-be-run instruction set, directly performing pipeline processing on the decoding results starting from an execute stage of a pipeline architecture; and for instructions coincident with the second-class instructions in the to-be-run instruction set, directly performing pipeline processing on the execution results starting from a memory operation stage of the pipeline architecture.

Embodiments of the present application provide a computer-readable storage medium. The computer-readable storage medium stores a computer program. A processor is configured to execute the computer program to implement the following steps: acquiring processing results of the target instruction set in different stages of a pipeline architecture when the pipeline flushing request is received; correspondingly saving the target instruction set and the processing results in the different stages of the pipeline architecture; and correspondingly, directly performing pipeline processing on the processing results according to the pipeline architecture starting from a next stage of a pipeline architecture stage corresponding to the processing results.

Embodiments of the present application provide a computer-readable storage medium. The computer-readable storage medium stores a computer program. A processor is configured to execute the computer program to implement the following step: correspondingly saving the target instruction set and the pipeline processing result in a preset storage device.

The computer-readable storage medium used in the present application may include a random access memory (RAM), a memory, a read-only memory (ROM), an electrically programmable ROM, an electrically erasable programmable ROM, a register, a hard disk, a removable disk, a CD-ROM, or any other form of storage medium known in the art.

All embodiments are described in the present invention by using the progressive method. Each embodiment describes only the difference from other embodiments. For the same or similar parts among all embodiments, reference may be made to the relevant parts. For the apparatus disclosed in the embodiments, because the apparatus corresponds to the method disclosed in the embodiments, the description is relatively simple. For related parts, reference may be made to the description of the method part.

A person skilled in the art may further be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. If the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be directly implemented by hardware, a software module executed by a processor, or a combination thereof. The software module may reside in a RAM, a memory, a ROM, an electrically programmable ROM, an electrically erasable programmable ROM, a register, a hard disk, a removable disk, a CD-ROM, or any other form of storage medium known in the art.

Finally, it should be noted that the relational terms herein such as first and second are used only to differentiate an entity or operation from another entity or operation, and do not require or imply any actual relationship or sequence between these entities or operations. Moreover, the terms "include", "include", or any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, the method, the object or the device which includes the element.

The method, system and device for pipeline processing of instructions, and the computer-readable storage medium provided in the present invention are described above in detail. Although the principle and implementations of the present invention are described by using specific examples in this specification, descriptions of the embodiments are merely intended to help understand the methods and core idea of the present invention. In addition, for a person of ordinary skill in the art, according to the idea of the present invention, changes may be made to the specific implementation and the scope of application. In summary, the content of this specification should not be construed as a limitation to the present invention.

The invention claimed is:

1. A method for pipeline processing of instructions, comprising:
    acquiring a target instruction set;
    acquiring a target prediction result, wherein the target prediction result is a result obtained by predicting a jump mode of the target instruction set;
    performing pipeline processing on the target instruction set according to the target prediction result; and
    in response to determining a pipeline flushing request is received, and in response, correspondingly saving the target instruction set and a corresponding pipeline processing result, so as to perform pipeline processing on the target instruction set again on the basis of the pipeline processing result, wherein after the correspondingly saving the target instruction set and the corresponding pipeline processing result, the method further comprises:
    acquiring a to-be-run instruction set;
    in response to determining the to-be-run instruction set is coincident with the target instruction set; and
    in response to the to-be-run instruction set being coincident with the target instruction set, performing pipeline processing on the to-be-run instruction set according to the corresponding pipeline processing result; or
    in response to the to-be-run instruction set not being coincident with the target instruction set, directly performing pipeline processing on the to-be-run instruction set;
    wherein the correspondingly saving the target instruction set and the corresponding pipeline processing result comprises:
    in response to the pipeline flushing request being received, using unexecuted instructions in the target instruction set as first-class instructions, and using instructions other than the first-class instructions in the target instruction set as second-class instructions;
    acquiring decoding results of the first-class instructions, and correspondingly saving the first-class instructions and the decoding results; and
    acquiring execution results of the second-class instructions, correspondingly saving the second-class instructions and the execution results; and the performing pipeline processing on the to-be-run instruction set according to the corresponding pipeline processing result comprises:
    for instructions coincident with the first-class instructions in the to-be-run instruction set, directly performing pipeline processing on the decoding results starting from an execute stage of a pipeline architecture; and
    for instructions coincident with the second-class instructions in the to-be-run instruction set, directly performing pipeline processing on the execution results starting from a memory operation stage of the pipeline architecture.

2. The method according to claim 1, wherein the correspondingly saving the target instruction set and the corresponding pipeline processing result comprises:
    acquiring a PC value of the target instruction set, the corresponding pipeline processing result, and an instruction code; and
    correspondingly saving the target instruction set and the corresponding pipeline processing result according to a preset format, element types in the preset format comprising a pipeline processing result, an instruction code, and a PC value; and
    in response to determining the to-be-run instruction set is coincident with the target instruction set comprises:
    acquiring a PC value of the to-be-run instruction set; and
    in response to determining the PC value of the to-be-run instruction set is coincident with the PC value of the target instruction set, and in response, determining that the to-be-run instruction set is coincident with the target instruction set, or if not, or determining that the to-be-run instruction set is not coincident with the target instruction set.

3. The method according to claim 2, wherein the correspondingly saving the target instruction set and the corresponding pipeline processing result comprises:
    acquiring decoding results of instructions in the target instruction set; and
    correspondingly saving the target instruction set and the decoding results; and
    the performing pipeline processing on the to-be-run instruction set according to the corresponding pipeline processing result comprises:
    directly performing pipeline processing on the decoding results starting from an execute stage of a pipeline architecture.

4. The method according to claim 2, wherein the correspondingly saving the target instruction set and the corresponding pipeline processing result comprises:
    acquiring processing results of the target instruction set in different stages of a pipeline architecture in response to the pipeline flushing request being received; and
    correspondingly saving the target instruction set and the processing results in the different stages of the pipeline architecture; and
    the performing pipeline processing on the to-be-run instruction set according to the corresponding pipeline processing result comprises:
    directly performing pipeline processing on the processing results according to the pipeline architecture starting from a next stage of a pipeline architecture stage corresponding to the processing results.

5. The method according to claim 2, wherein the correspondingly saving the target instruction set and the corresponding pipeline processing result comprises:

correspondingly saving the target instruction set and the corresponding pipeline processing result in a preset storage device.

6. The method according to claim 1, wherein the correspondingly saving the target instruction set the corresponding pipeline processing result comprises:
acquiring decoding results of instructions in the target instruction set; and
correspondingly saving the target instruction set and the decoding results; and
the performing pipeline processing on the to-be-run instruction set according to the corresponding pipeline processing result comprises:
directly performing pipeline processing on the decoding results starting from an execute stage of a pipeline architecture.

7. The method according to claim 6, wherein the correspondingly saving the target instruction set and the corresponding pipeline processing result comprises:
correspondingly saving the target instruction set and the corresponding pipeline processing result in a preset storage device.

8. The method according to claim 1, wherein the correspondingly saving the target instruction set and the corresponding pipeline processing result comprises:
acquiring processing results of the target instruction set in different stages of a pipeline architecture in response to the pipeline flushing request being received; and
correspondingly saving the target instruction set and the processing results in the different stages of the pipeline architecture; and
the performing pipeline processing on the to-be-run instruction set according to the corresponding pipeline processing result comprises:
directly performing pipeline processing on the processing results according to the pipeline architecture starting from a next stage of a pipeline architecture stage corresponding to the processing results.

9. The method according to claim 1, wherein the correspondingly saving the target instruction set and the corresponding pipeline processing result comprises:
correspondingly saving the target instruction set and the corresponding pipeline processing result in a preset storage device.

10. A device for pipeline processing of instructions, comprising:
a memory, configured to store a computer program; and
a processor, configured to execute the computer program to implement the method according to claim 1.

11. A non-transitory computer-readable storage medium, the non-transitory computer-readable storage medium storing a computer program, the computer program being executed by a processor to implement the method according to claim 1.

* * * * *